United States Patent [19]

Tomatis

[11] Patent Number: 5,125,329
[45] Date of Patent: Jun. 30, 1992

[54] APPARATUS FOR CONTINUOUSLY PRODUCING AND MATURING CURDS

[75] Inventor: Stefano Tomatis, Peveragno, Italy

[73] Assignee: CMT Costruzioni Meccaniche E Tecnologia S.p.A., Peveragno, Italy

[21] Appl. No.: 678,405

[22] Filed: Apr. 1, 1991

[30] Foreign Application Priority Data

Apr. 9, 1990 [IT] Italy .................. 67266 A/90

[51] Int. Cl.$^5$ .................. A01J 25/00; A23C 19/00
[52] U.S. Cl. .................. 99/453; 99/452; 99/456; 99/460; 366/20; 366/45; 366/185; 366/189
[58] Field of Search .................. 99/452, 453, 460, 464, 99/466, 348, 456–459; 366/18, 19, 20, 45, 47, 50, 76, 156–158, 185, 186, 189, 318

[56] References Cited

U.S. PATENT DOCUMENTS

| | | | |
|---|---|---|---|
| 1,241,501 | 10/1917 | Edgecomb | 366/141 X |
| 1,642,445 | 9/1927 | Jacobson | 366/76 |
| 1,862,563 | 6/1932 | Bell | 99/348 |
| 2,039,162 | 4/1936 | Gerstenberg | 99/466 |
| 3,047,951 | 8/1962 | LeBoeuf | 99/452 |
| 3,134,579 | 5/1964 | Booth, Sr. | 366/20 |
| 3,173,664 | 3/1965 | Isaacson et al. | 366/189 |
| 4,108,057 | 8/1978 | Hain et al. | 99/460 |
| 4,331,069 | 5/1982 | Tomatis | 99/456 |
| 4,940,335 | 7/1990 | Gibson | 366/46 |
| 4,947,742 | 8/1990 | Nishibayashi | 99/453 X |

FOREIGN PATENT DOCUMENTS

| | | | |
|---|---|---|---|
| 268731 | 7/1912 | Fed. Rep. of Germany | 366/20 |
| 3504397 | 8/1986 | Fed. Rep. of Germany | 366/20 |

*Primary Examiner*—Timothy F. Simone
*Attorney, Agent, or Firm*—Guido Modiano; Albert Josif

[57] ABSTRACT

The apparatus is capable of supplying curds continuously, and comprises: a horizontal channel with a tapered bottom, having a feeding auger arranged in the bottom and actuatable by motor means; several cradles with semicircular section, rotatably carried in a horizontal position in the channel above the auger, and having a diameter slightly less than the distance between opposite walls of the channel, and actuatable by actuator means to take a first position with their mouths looking upwards and a second position with their mouths looking downwards; and several cheesemaking tipping vats arranged side-by-side with the channel and adapted to pour curds into the cradles while the latter are in their first position.

14 Claims, 3 Drawing Sheets

APPARATUS FOR CONTINUOUSLY PRODUCING AND MATURING CURDS

BACKGROUND OF THE INVENTION

This invention is concerned with an apparatus for continuously producing and maturing curds, which is able to feed a cheese processing line substantially continuously, particularly in the production of pasta filata cheese, such as mozzarella and the like.

In the production of pasta filata cheese, numerous machines have been developed in past years for mechanizing different processing steps, such as curd stretching or cooking, moulding the stretched curd into several round or cylindrical shapes, hardening the cheese in cold water or brine, packaging the finished cheese in envelopes of different types. This has progressively reduced the manual toil and repetitiveness, while production has been transformed to a large extent into a continuous process, replacing the batch processing which was previously used, and which involved a large requirement of manpower.

However, the initial step of curd production and maturation has not been made continuous until now, as well as the curd delivery to the stretching machine at the start of the continuous line, because this would inevitably give rise to undesirable changes in biochemical factors, and therefore also to alterations of the product with respect to the consumers' expectations. Curdling, curd maturation, and subsequent loading of the curd to the stretching machine are operations that are still performed by batches, the immediately subsequent handling (curd dicing and curd feeding to the stretching, moulding and hardening lines) being performed manually; the curds are poured from the cheesemaking vats to movable trucks, where the curd is manually cut into blocks and then loaded, block by block, often still by hand, to the hoppers of the stretching or cooking machines. This mode of operation, besides the obvious cost disadvantage due to the considerable involvement of manpower, also has other drawbacks, such as toil and boredom for the staff, and, even more important, physical contact between the working persons and the curds, which is undesirable for health reasons.

The main object of the invention is therefore to provide an apparatus or device which, without altering the traditional biochemical process of curd production, and without forcing changes in the traditional techniques of curd production, is capable of providing a substantially continuous and mechanized delivery of mature curds to the stretching machine at the start of the subsequent continuous processing line.

SUMMARY OF THE INVENTION

The invention achieves the above object, as well as other objects and advantages, such as will appear from the following description, with an apparatus for producing and maturing curds, for continuously feeding curds, particularly in the production of pasta filata cheese, characterized in that it comprises:

a horizontal channel with tapered bottom, having a feeding auger arranged in the bottom and actuatable by motor means;

at least a cradle with semicircular section, rotatably carried in horizontal position in the channel above the auger, having a diameter slightly less than the distance between opposite walls of the channel, and actuatable by actuator means to take a first position with its mouth looking upwards and a second position with its mouth looking downwards; and at least a first cheesemaking tipping vat arranged side-by-side with the channel and adapted to pour curds into the cradle while the latter is in its first position.

BRIEF DESCRIPTION OF THE DRAWINGS

The invention will now be described in more detail with reference to preferred embodiments, shown in the attached drawings, given by way of illustration and nonlimiting example, and wherein:

FIG. 5 is a detail view of a curd dicer which is part of the apparatus of FIG. 1.

DESCRIPTION OF PREFERRED EMBODIMENTS

Figure 1:
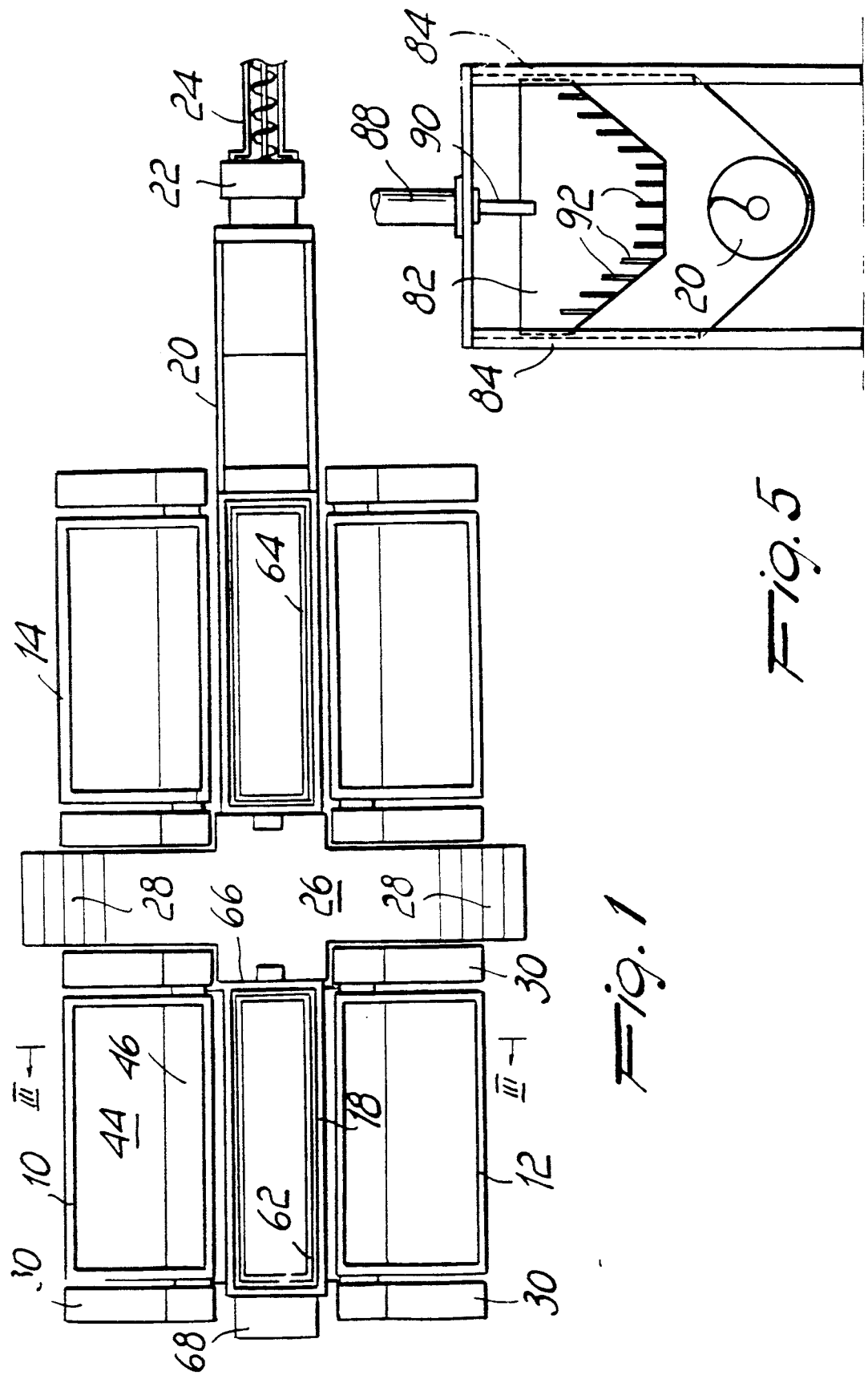
FIG. 1 is a plan view of an apparatus made according to the invention.

With reference to FIG. 1, the apparatus of the preferred embodiment of the invention comprises two symmetrical pairs of cheesemaking tipping vats 10, 12 and 14, 16, e.g. of the kind described in prior Italian patent No. 1.162.252, filed on Feb. 26, 1980, and arranged in two symmetrical, facing rows. Between the two rows of cheesemaking vats a semi-continuous curd maturator 18 is arranged, which is described below, and which extends along the entire front of the two pairs of cheesemaking vats, and is connected for supplying curd to a conventional auger feeder 20. Auger feeder 20 supplies curds (as best understood from the disclosure below) to a curd dicer 22, described below, from which the diced curds are fed to an elevator 24 for continuously supplying operating machines such as stretchers, moulders, etc., not shown. An inspection bridge 26, having access ladders 28, is suspended above maturator 18, in the intermediate area between two adjacent cheesemaking vats.

Figure 2:
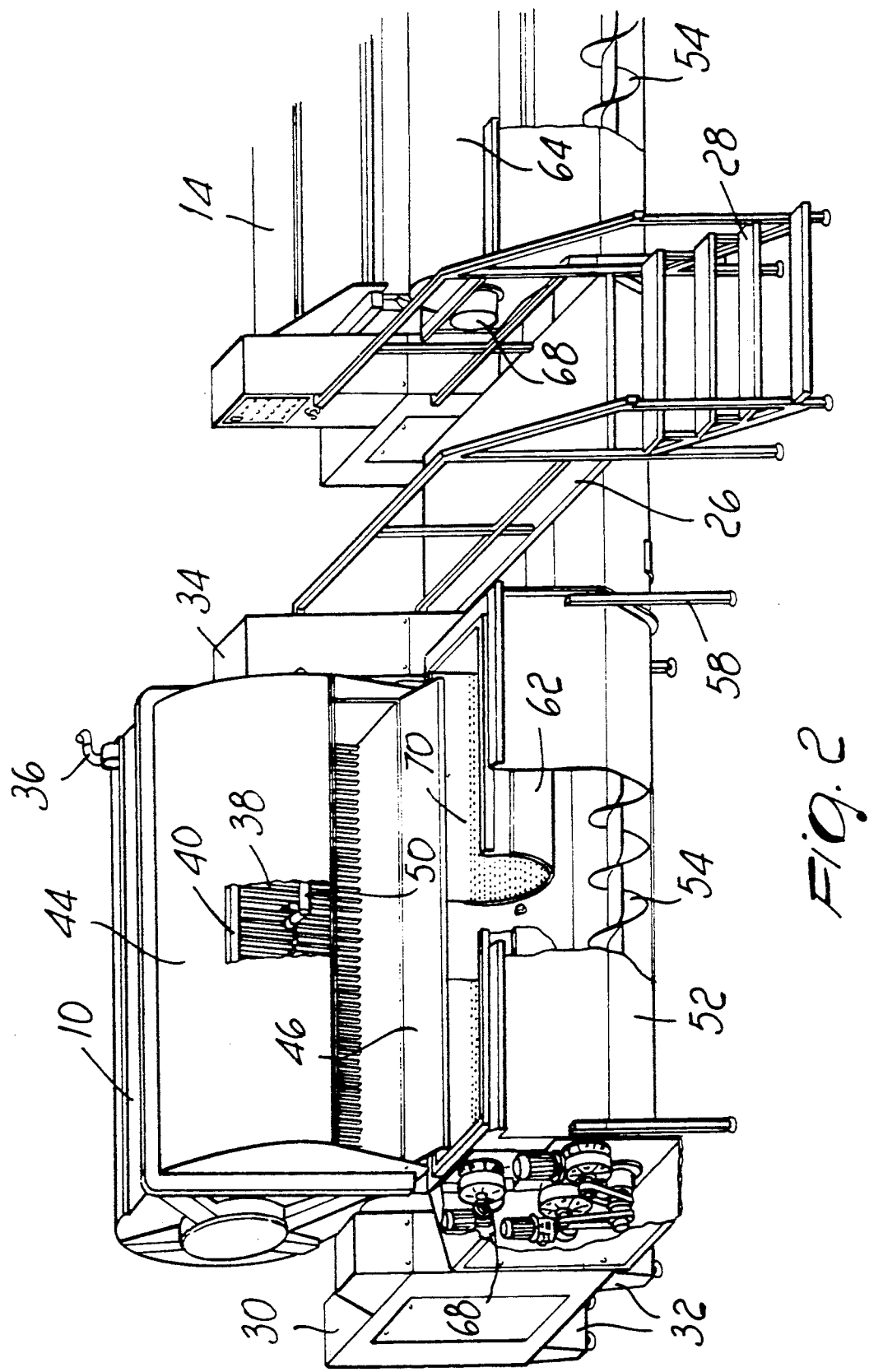
FIG. 2 is a partial prospective view of the apparatus of FIG. 1, with parts broken away, and with omission of the cheesemaking vats on the right hand side of the maturator, for clarity.
Figure 3:
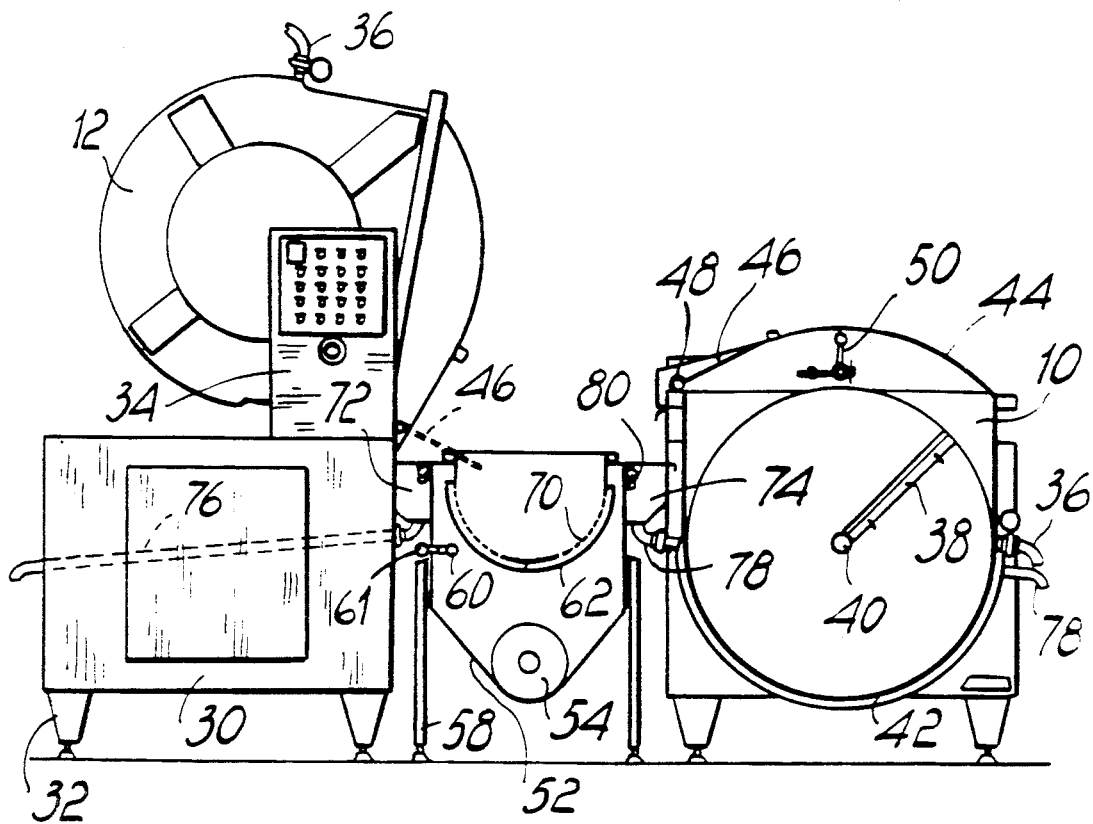
FIG. 3 is an elevation view of the apparatus of FIG. 1 in a first operating condition, partly broken away along line III—III.
Figure 4:
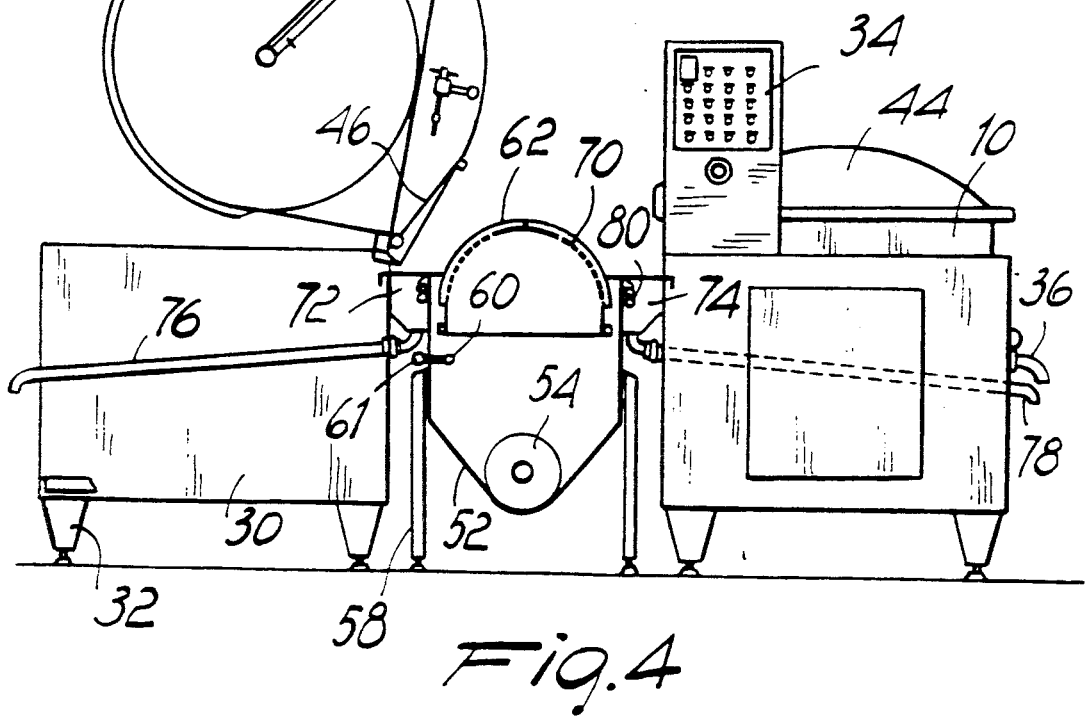
FIG. 4 is a view similar to FIG. 3, in a second operating condition.

With reference now to FIGS. 2, 3 and 4, each of cheesemaking vats 10, 12, 14 or 16 comprises a tank of large capacity, such as 10, which is journaled at two upper corners to standards such as 30, supported on feed such as 32, with actuator means not shown for tipping the vat around its journal axis. An electric control board 34 is mounted on one or more of standards 30. The vat is provided with a whey overflow tap 36, and has a cutting harp such as 38, capable of turning around a shaft 40 under the action of driving means not shown. Preferably, at least a portion of the side wall of the vat is provided with a water jacket 42, for regulating the internal temperature of the vat.

According to the invention, the top of vat 10 is covered by a bulged fixed over 44, extending over ca. ⅔ of the mouth of the vat, and by a door 46, covering the aperture free form cover 44, and hinged at 48, so that it can open and act as a chute as described below. a cleaning device 50, known per se, is installed under cover 44.

The curd maturator 18 comprises a channel 52 having two downwardly converging side walls, with a feeding auger 54 arranged at its bottom and driven by motor means 56 (FIG. 2). The channel is supported by feet 58, and has cleaning heads such as 60, installed along its internal walls and connected through pipes 61, to cleaning equipment known per se and not shown. At each pair of cheesemaking vats, 10, 12 and 14, 16, respectively, the channel accommodates respective cradles 62, 64, made of metal plate, having a semicircular cross-section, of a diameter slightly shorter than the distance between facing walls of channel 52. Each of cradles 62 and 64 is closed by end walls at both ends, and is rotatably journaled in corresponding cross-beams or covers 66, extending over channel 52 in the area between the cradles. Actuator means such as a motor 68 with reduction gear are arranged for controllably turning each of the cradles around its axis.

Preferably, each cradle 62 or 64 has an internal perforated plate 70 forming a jacket with the outside plate of the cradle, in order to allow the curd to drain further during its stay in the cradle, as described below.

Respective gutters 72, 74 are attached along the two opposite sides of channel 52, at its upper edges, the gutters being provided with drain pipes 76, 78 which lead into tanks not shown. Gutters 72, 74 are also provided with cleaning heads such as 80.

With reference to FIG. 5, the curd dicer is preferably of the sash-window type, with a trapezoidal blade 82 sliding vertically along slots made in a couple of vertical uprights 84 placed at the forward end of feeder 20. A cross-beam 86 extending between the uprights carriers a hydraulic cylinder 88 having a rod 90 connected to blade 82 for moving the blade vertically. The lower edge of blade 82 is provided with short equidistant knives 92, extending at right angles to the blade.

In the operation of the apparatus, each of the four cheesemaking vats 10, 12, 14 and 16 is loaded in time shift with milk seeded with a curdling starter. When the curds in the first vat are ready, the whey is partly drained through overflow tap 36. The vat is then tipped to a vertical position (left-hand vat on FIG. 3), after unbolting door 46 so that it overturns and comes to rest on the edge of the associated cradle and operates as chute for the curds pouring into cradle 62 (as shown in dashed lines on FIG. 3). The excess whey will drain behind the hinge of the chute, collecting into gutters 72, 74, and from there is will flow into collecting pipes not shown. The cheesemaking vat is immediately brought to its horizontal position and can be reloaded with fresh milk, in order to prepare a new batch of curds. Cradle 62 is left in the position of FIG. 3 for further maturation of the curds, and, at the desired moment, motor 68 is actuated to turn the cradle through a half turn, so that its contents, now having hardened into a relatively dry mass, are dropped into channel 52 beneath. The curds in the channel are seized by auger 54 and are pushed toward feeder 20 and dicer 22, where the cutting edges of blade 82 and of associated transverse knives 92 cuts the curds into small cubes. These are then they are processed in the following operating machines, e.g. continuous machines, such as stretchers, moulders, etc.

If the four cheesemaking vats 10, 12, 14, 16 are loaded in a suitable time shift, taking into account the curdling and maturing delays, fresh matured curds can be dropped into channel 52 as the supply in feeder 22 is exhausted. The supply of curds reaching elevator 24 is therefore continuous, even though the curd preparation process is per se disctoninuous. Cradles 62, 64 act as curd dwelling areas, for an extension of draining and maturation, and allow the cheesemaking vats to be quickly freed for new operations, without any increase in space occupation, and in a completely mechanized way.

The apparatus of the invention is also designed for an efficient mechanized cleaning (cleaning-in-place). While the cradles are in the position shown in FIG. 4, the cleaning heads are activated and both channel 52 and cradles 62, 64 are simultaneously cleaned, the cradles acting as a cover for the channel.

A preferred embodiment of an apparatus according to the invention has been described and shown, but it is understood that changes and modifications can be made in it within the inventive concept. As an example, the number of cheesemaking vats associated with the maturator could change, or, depending on the layout of the premises, the cheesemaking vats could be arranged only on one side of the che channel. Actuator means 34, 26, 38 could be replaced with different though equivalent means, either hydraulic or electromechanical. Some of the members disclosed, such as feeder 20 or dicer 22, may be omitted, or may be replaced with other devices.

We claim:

1. A curd producing and maturing apparatus, for continuously feeding curds, particularly in the production of pasta filata cheese, comprising:
    a horizontal channel having two lateral edges merging into a tapered bottom, and having a feeding auger arranged in the bottom and actuatable by motor means;
    at least one cradle with a substantially semicircular cross-section and having a cradle opening defining a mouth, said cradle being rotatably carried in a horizontal position in the channel above the auger, having a diameter slightly less than the distance between opposite walls of the channel, and actuatable by actuator means to take a first position with its mouth looking upwards and a second position with its mouth locking downwards; and
    at least a first cheesemaking tipping vat arranged side-by-side with the channel and adapted to pour curds into the cradle while the latter is in its first position.

2. The apparatus of claim 1, further comprising a second cheesemaking vat arranged on the opposite side of said channel, symmetrically with the first vat.

3. The apparatus of claim 1, comprising a plurality of cradles arrange din a row in the channel, and wherein at least one cheesemaking vat side-by-side with the channel is associated with each cradle.

4. The apparatus of claim 1, wherein each cheesemaking vat has a laterally hinged chute.

5. The apparatus of claim 1, wherein each cradle comprises an internal perforated plate forming a jacket with the outside wall of the cradle.

6. The apparatus of claim 1, further comprising two gutters along the lateral edges of the channel.

7. The apparatus of claim 1, further comprising cleaning heads mounted inside the channel for simultaneously cleaning the channel and the cradles while the later are in their second position.

8. The apparatus of claim 1, further comprising a curd dicer at one end of said channel.

9. The apparatus of claim 8, wherein the curd dicer comprises a blade across the channel and vertically movable between a channel-shutting position and a non-interfering position, and provided with knives extending at right angles from the blade along parallel vertical planes.

10. A curd handling device, for use in association with cheesemaking tipping vats, particularly in the production of pasta filata cheese, comprising:
- a horizontal channel having lateral edges merging into a tapered bottom, and having a feeding auger arranged in the bottom and actuatable by motor means; and
- at least one cradle with a substantially semicircular cross-section, comprising an internal perforated plate and an a outside wall forming a jacket with the perforated plate, the outside wall defining a mouth, the cradle being rotatably carried in a horizontal position in the channel above the auger, having a diameter slightly less than the distance between opposite walls of the channel, and actuatable by actuator means to take a first position with its mouth looking upwards and a second position with its mouth looking downwards.

11. The curd handling device of claim 10, further comprising two gutters along the lateral edges of the channel.

12. The curd handling device of claim 10, further comprising cleaning heads mounted inside the channel for simultaneously cleaning the channel and the cradles while the latter are in their second position.

13. The curd handling device of claim 10, further comprising a curd dicer at one end of said channel.

14. The curd handling device of claim 13, wherein the curd dicer comprises a blade across the channel and vertically movable between a channel-shutting position and a non-interfering position, and provided with knives extending at right angles from the blade along parallel vertical planes.

* * * * *